A. ALBRECHT. Clothes-Wringers.

No. 5,261. Reissued Jan. 28, 1873.

Witnesses { Jno. B. Harding
John Parker

A. Albrecht
by his Attys
Howson and Son

AM. PHOTO-LITHOGRAPHIC CO. N.Y. (OSBORNE'S PROCESS.)

UNITED STATES PATENT OFFICE.

AUGUST ALBRECHT, OF PHILADELPHIA, PENNSYLVANIA, ASSIGNOR, BY MESNE ASSIGNMENTS, TO AMERICAN MACHINE COMPANY.

IMPROVEMENT IN CLOTHES-WRINGERS.

Specification forming part of Letters Patent No. 112,669, dated March 14, 1871; reissue No. 5,261, dated January 28, 1873.

*To all whom it may concern:*

Be it known that I, AUGUST ALBRECHT, of Philadelphia, county of Philadelphia, State of Pennsylvania, have invented an Improvement in Clothes-Wringers, of which the following is a specification:

My invention consists of a clothes-wringer, constructed in the peculiar manner too fully described hereafter to need preliminary explanation, with the view to the attainment of simplicity and economy in the manufacture of the wringer.

Figure 1:
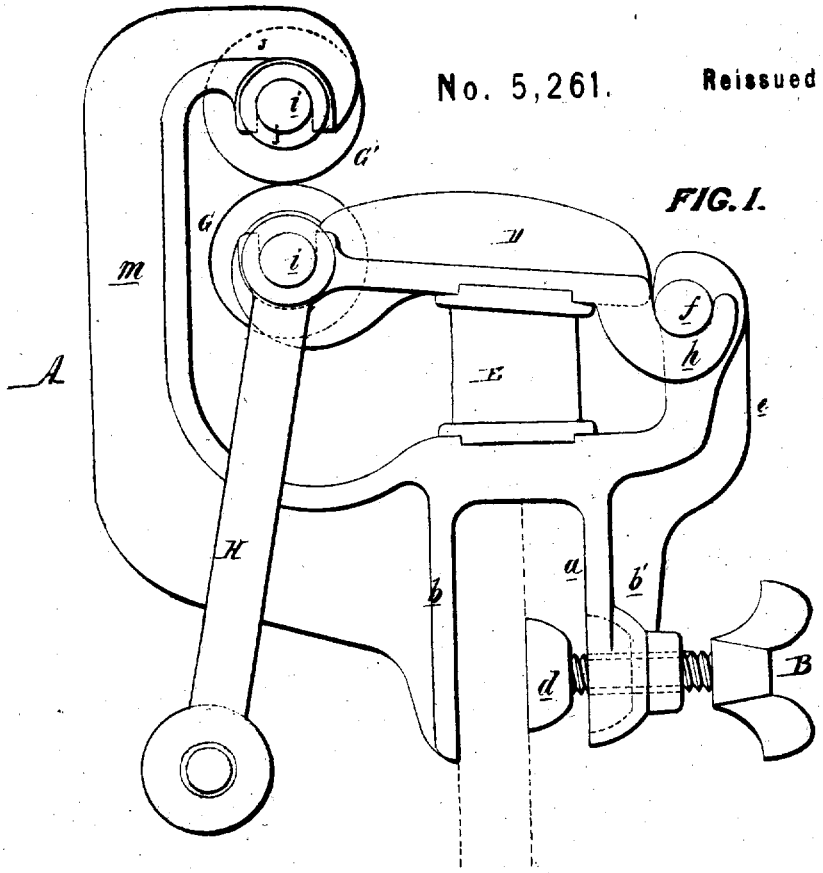
Figure 2:
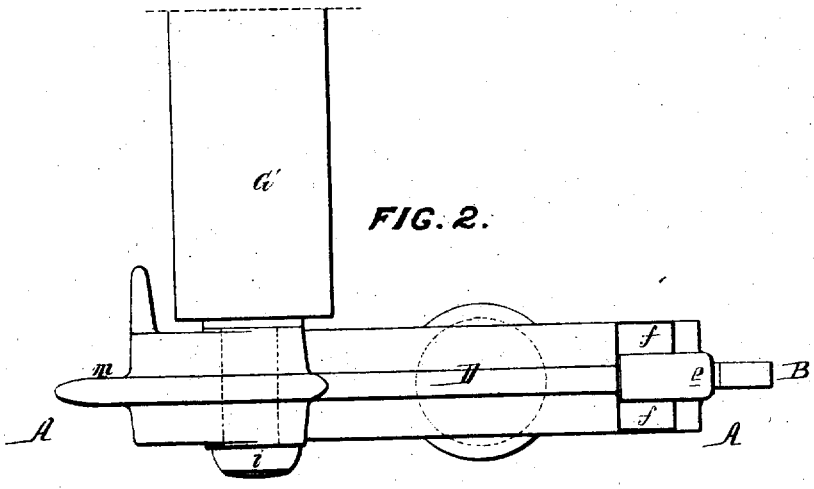

Figure 1 is a side view of my improved clothes-wringer, and Fig. 2 a plan view of one-half of the wringer.

The machine has two cast-iron frames, only one of which is shown in the drawing, as the other is precisely like it in construction. Each frame has a recess, *a*, formed by two pendent legs, *b* and *b'*, through the latter of which passes a thumb-screw, B, furnished at the end with a washer, *d*, so that the edge of a wash-tub can be griped between the leg *b* of the frame and the said washer *d*. Forming part of each frame is a projection, *e*, on which is cast a fulcrum, *f*, adapted to the hooked end *h* of a lever, D. Between the under side of this lever D and the top of the frame A intervenes a substantial spring, E, which I arrange as near the fulcrum of the lever as circumstances will permit. At the outer end of the lever D is formed a bearing for the spindle *i* of the lower gum-roller G, directly above which is the upper gum-roller G', the spindle *i* of the latter having its bearing in the end of the projection *m* of the frame A, this projection being so far in front of the frame as to be clear of the lever D.

The main object of my invention has been economy in construction, and this I have attained in the following respects: First, the fulcrum of the lever D is cast on the frame, and the end of the lever is simply hooked under the fulcrum, the desired connection being thus formed without any boring of holes or turning of detachable pins; second, the spindles of the rollers may turn in half-bearings, so that the usual boring of bearings for the spindles may be avoided, the said half-bearings being simply cleaned out carefully; third, the parts can be readily fitted together and as readily taken apart, especial facilities for putting the machine together being afforded by the peculiar construction of the frames, the projections *m* of which are so situated as not to interfere with the ready introduction of the levers D to their places and their ready withdrawal; fourth, I can dispense with the usual screws, which, in ordinary wringers, serve to impart more or less pressure of the yielding roller against that which revolves in fixed bearings, for I have found that by using a substantial spring as near the fulcrum of the lever as possible all the desired pressure can be obtained, and yet the lower roller will yield sufficiently to permit thick masses of clothes to pass between it and the upper roller.

I claim—

1. A clothes-wringer in which are combined, substantially in the manner described, levers D carrying the roller G, and a spring, E, situated between the fulcrum of each lever and the said roller.

2. The combination described, of the projections *m* of the frames and their bearings for the upper roller, with the levers D carrying the lower roller.

3. The combination of the frame A and its fulcrum *f* with the lever D, having a hooked end, *h*, all substantially as specified.

In testimony whereof I have signed my name to this specification in the presence of two subscribing witnesses.

AUGUST ALBRECHT.

Witnesses:
WM. A. STEEL,
HUBERT HOWSON.